United States Patent
Nix et al.

(10) Patent No.: US 7,367,112 B2
(45) Date of Patent: May 6, 2008

(54) METHOD OF FABRICATING A HEAD FOR PERPENDICULAR MAGNETIC RECORDING WITH A SELF-ALIGNING SIDE SHIELD STRUCTURE

(75) Inventors: James L. Nix, Gilroy, CA (US); Neil Leslie Robertson, Palo Alto, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 264 days.

(21) Appl. No.: 11/354,139

(22) Filed: Feb. 14, 2006

(65) Prior Publication Data
US 2007/0186408 A1 Aug. 16, 2007

(51) Int. Cl.
*G11B 5/193* (2006.01)
(52) U.S. Cl. .................. 29/603.15; 29/603.12; 29/603.13; 29/603.14; 29/603.16; 29/603.18; 360/122; 360/125; 216/22; 216/41
(58) Field of Classification Search ............. 29/603.07, 29/603.12, 603.13, 603.14, 603.15, 603.16, 29/603.18; 360/319, 320, 122, 125; 216/22, 216/41, 44
See application file for complete search history.

(56) References Cited

U.S. PATENT DOCUMENTS

| | | | |
|---|---|---|---|
| 4,656,546 A | 4/1987 | Mallory | |
| 4,935,832 A | 6/1990 | Das et al. | |
| 5,075,956 A | 12/1991 | Das | |
| 5,634,260 A | 6/1997 | Nix et al. | |
| 5,992,004 A | 11/1999 | Sato et al. | |
| 6,101,068 A | 8/2000 | Ohtomo et al. | |
| 6,469,876 B1 | 10/2002 | Sasaki et al. | |
| 6,609,291 B1 | 8/2003 | Sasaki et al. | |
| 6,641,984 B2 | 11/2003 | Kamijima | |
| 6,655,009 B2 * | 12/2003 | Huang et al. | 29/603.15 |
| 6,671,135 B2 | 12/2003 | Sasaki et al. | |
| 6,678,940 B2 | 1/2004 | Sato | |

FOREIGN PATENT DOCUMENTS

JP 58-171709 * 10/1983

* cited by examiner

*Primary Examiner*—A. Dexter Tugbang
(74) *Attorney, Agent, or Firm*—G. Marlin Knight

(57) ABSTRACT

A method is provided for fabricating a head for perpendicular recording with self-aligning side shields. The voids where the side shields will be formed are milled into the layer of material for the pole tip to achieve self-alignment. A mask is patterned with openings defining initial shape of the pole piece tip nearest the air-bearing surface including the width and the point at which the pole tip widens out. A film of soft magnetic material to form the side shields is deposited over the wafer. A chemical-mechanical-polishing process is preferably used to remove the mask and the material deposited on it. A new mask is patterned over the predetermined area for the final shape of the pole tip and the side shields. The excess side shield material and pole tip material outside of the mask is then removed.

8 Claims, 7 Drawing Sheets

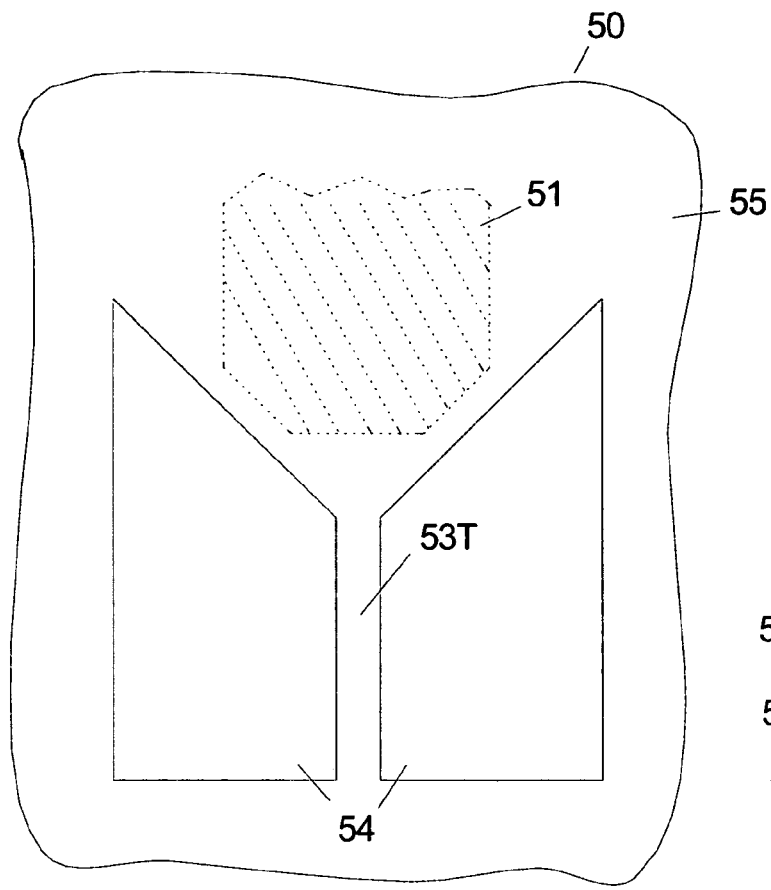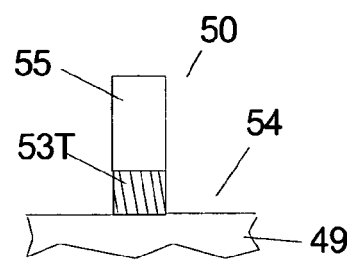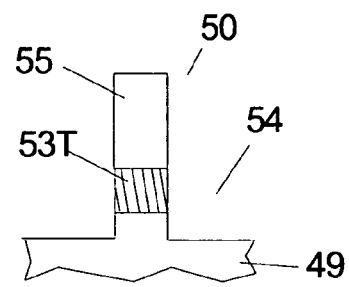
Fig. 3A    Fig. 3B
Fig. 3C

METHOD OF FABRICATING A HEAD FOR PERPENDICULAR MAGNETIC RECORDING WITH A SELF-ALIGNING SIDE SHIELD STRUCTURE

RELATED APPLICATIONS

Commonly assigned U.S. patent application (published as 20050068671) by Hsu, et al. (Ser. No. 10/675,046) describes a magnetic transducer with separated read and write heads for perpendicular recording. The write head has a trailing shield that extends from the return pole piece toward the main pole piece to form the write gap at the air-bearing surface. One embodiment of the trailing shield is a two part structure with a pedestal and a much smaller tip that confronts the main pole piece at the gap. The application bearing Ser. No. 10/675,046 is hereby incorporated by reference in its entirety into the present application.

Commonly assigned U.S. patent application (published as 20050068678) by Hsu, et al. (Ser. No. 10/676,742) describes a head for perpendicular recording that has a trailing shield and side shields that are connected to the return pole piece by two studs of ferromagnetic material. The application bearing Ser. No. 10/676,742 is hereby incorporated by reference in its entirety into the present application.

FIELD OF THE INVENTION

The invention relates to thin film magnetic transducers for perpendicular recording and more particularly to the inductive write head portion of the transducer and even more particularly to the design of the shields and pole pieces for the inductive write head.

BACKGROUND OF THE INVENTION

In a typical prior art magnetic disk recording system a slider containing magnetic transducers for reading and writing magnetic transitions flies above the disk while it is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive.

In a disk drive using perpendicular recording the recording head is designed to direct magnetic flux through the recording layer in a direction which is generally perpendicular to the plane of the disk. Typically the disk 27, shown in FIG. 9, for perpendicular recording has a set of thin films 28 that include a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The shape and size of the main pole and any shields are the primary factors in determining the track width.

SUMMARY OF THE INVENTION

An embodiment of the invention is a method for fabricating a head for perpendicular recording with self-aligning side shields. The voids where the side shields will be formed are milled into the layer of material for the pole tip to achieve self-alignment. A shaping pad of ferromagnetic pole piece material is formed first to provide the flux path to the pole tip. A full film of pole piece material is deposited over the planarized wafer including the shaping pad. A mask is patterned with openings defining initial shape of the pole piece tip nearest the air-bearing surface including the width and the point at which the pole tip widens out. The voids on the sides of the predetermined area for the pole tip define the initial shape of the side shields. The pole piece material in the exposed areas of the mask is removed leaving the pole tip material under the mask. In an alternative embodiment some material below the ferromagnetic material in the voids is also removed so that the side shields will be thicker than the pole tip. An insulating film is deposited over the wafer including on the exposed sidewalls of the pole tip to serve as the shield gap. A film of soft magnetic material to form the side shields is deposited over the wafer. The side shields are separated from the pole tip by the gap layer material on the sidewalls of the pole tip. A chemical-mechanical-polishing process is preferably used to remove the mask and the material deposited on it. A new mask is patterned over the predetermined area for the final shape of the pole tip and the side shields. The excess side shield material and pole tip material outside of the mask is then removed. The mask is removed and prior art processing to complete the head. A trailing shield can be included in a head according to the invention.

BRIEF DESCRIPTION OF THE FIGURES

FIG. 3A is an illustration of a plan view of a wafer at a third selected point, subsequent to FIG. 2, in the process of making a magnetic head according to the invention.

FIG. 3B is an illustration of a section of a wafer corresponding to FIG. 3A. The section is taken perpendicular to the surface of the wafer and to the final air-bearing surface of the head.

FIG. 3C is an illustration of a section of a wafer taken perpendicular to the surface illustrating an alternative embodiment in which the side shields are thicker than the pole tip.

DETAILED DESCRIPTION OF THE INVENTION AND THE PREFERRED EMBODIMENTS

Figures 1A, 1B:
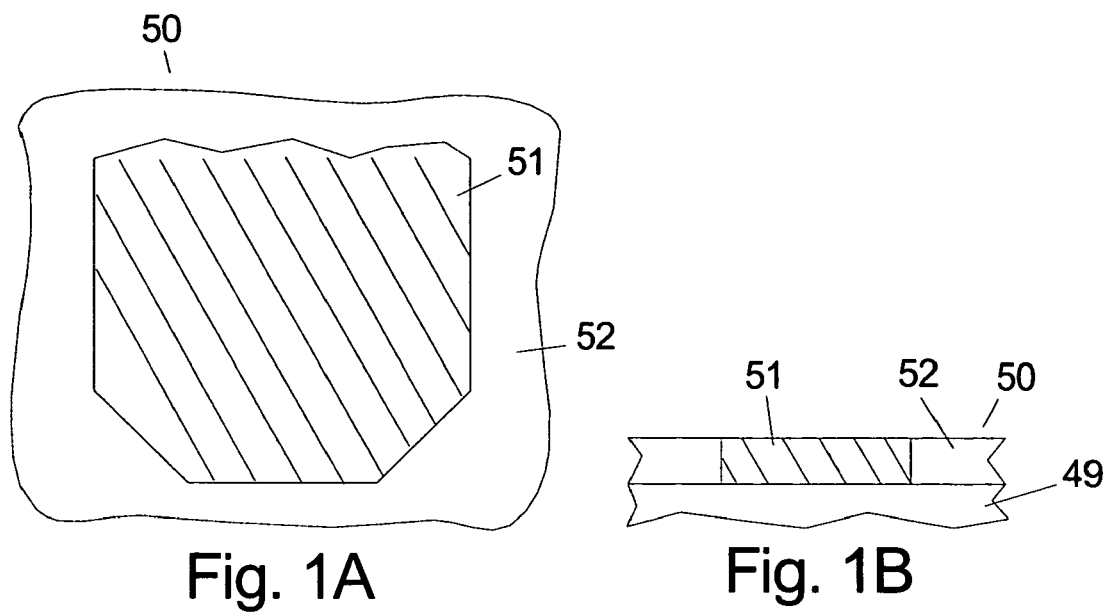
FIG. 1A is an illustration of a plan view of a wafer at a first selected point in the process of making a magnetic head according to the invention.
FIG. 1B is an illustration of a section of a wafer at a first selected point, corresponding to FIG. 1A, in the process of making a magnetic head according to the invention. The section is taken perpendicular to the surface of the wafer and to the final air-bearing surface of the head.

FIG. 1A is an illustration of a plan view of a wafer 50 at a first selected point in the process of making a magnetic head according to the invention. The shaping pad 51 has been patterned from a layer of ferromagnetic material of the type used in pole pieces in thin film magnetic heads for perpendicular recording, for example, NiFe. The shaping pad extends for about 10 microns in the vertical direction as shown in the figure, but only a small portion is shown. The shaping pad stops before the ABS. After patterning the shaping layer the wafer is refilled with an insulating material 52 such as alumina and planarized. FIG. 1B is an illustration of a section of a wafer at a first selected point in the process corresponding to FIG. 1A. The section is taken perpendicular to the surface of the wafer and to the final air-bearing surface (ABS) of the head. This figure and the others included herein are not to scale, in part, because the smaller components and spacings would be unclear. The relative sizes and dimensions are according to prior art unless otherwise noted.

Figure 2:
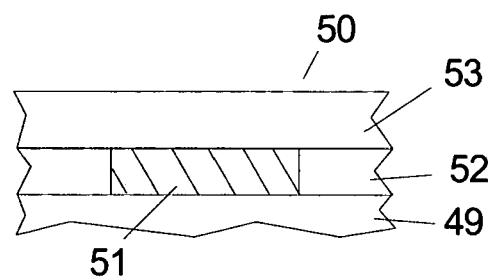
FIG. 2 is an illustration of a section of a wafer at a second selected point, subsequent to FIG. 1A, in the process of making a magnetic head according to the invention. The section is taken perpendicular to the surface of the wafer and to the final air-bearing surface of the head.

FIG. 2 is an illustration of a section of the wafer at a second selected point, subsequent to FIGS. 1A and 1B showing film 53 of ferromagnetic pole piece material, suitable for a perpendicular head, which has been deposited over the entire wafer.

FIG. 3A is an illustration of a plan view of a wafer at a third selected point, subsequent to FIG. 2 showing the mask 55 which has trapezoidal-shaped voids 54 at the sides of the protected material for the pole tip 53T. The initial area for deposition of the side shield material is defined by the voids 54 in the mask. The protected area for the pole tip widens out just before overlapping with the shaping layer 51. After the mask 55 has been patterned, the pole material that is exposed in the voids is removed by ion milling. FIG. 3B is an illustration of a section of a wafer corresponding to FIG. 3A after the pole material has been removed in the unmasked areas. The section is taken perpendicular to the surface of the wafer and to the final air-bearing surface of the head. Since the voids where the side shields will be formed are milled into the layer of material for the pole tip, the side shields are self-aligning. The width of the pole tip is defined by the lithography and in a preferred embodiment is about 40 to 200 nm.

Figure 4:
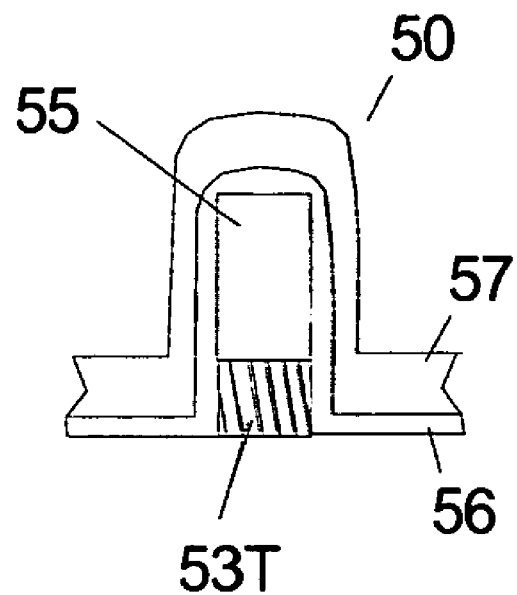
FIG. 4 is an illustration of a section of a wafer subsequent to FIG. 3B after the deposition of the gap layer and the material for the side shields. The section is taken perpendicular to the surface of the wafer and to the final air-bearing surface of the head.

Films for the nonmagnetic gap 56 and side shields 57 are deposited over the wafer as illustrated in FIG. 4. The preferred material for the gap is an oxide such as aluminum oxide or silicon oxide. The gap material is deposited first. The gap material will be deposited on the sidewall of the pole tip 53T and will separate the side shields from the pole tip. The thickness of the gap on the sidewall can be about 70 nm. The material for the side is deposited next. The ferromagnetic material and the thickness of the side shields should be designed so that they to not saturate during the writing process. One alternative is to make the side shields thicker than the pole tip which is illustrated in FIG. 3C. In this alternative the voids 54 for the side shields are etched to a level below the bottom side of the pole tip. As an example, if the pole tip is 150 nm thick, the side shield on the order of 250 nm could be formed using this approach. In another alternative, the side shields can also be made from a material with a higher moment than the pole tip. A chemical-mechanical-polishing process is used to remove the mask, the material deposited on it and to planarized the wafer as shown in FIG. 5.

Figure 5:
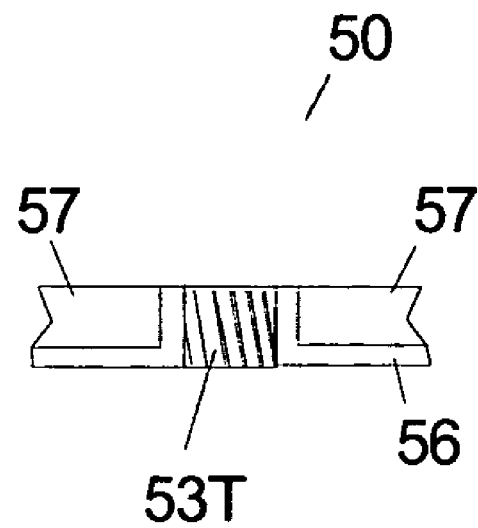
FIG. 5 is an illustration of a section of a wafer subsequent to FIG. 4 after the wafer has been planarized. The section is taken perpendicular to the surface of the wafer and to the final air-bearing surface of the head.
Figure 6:
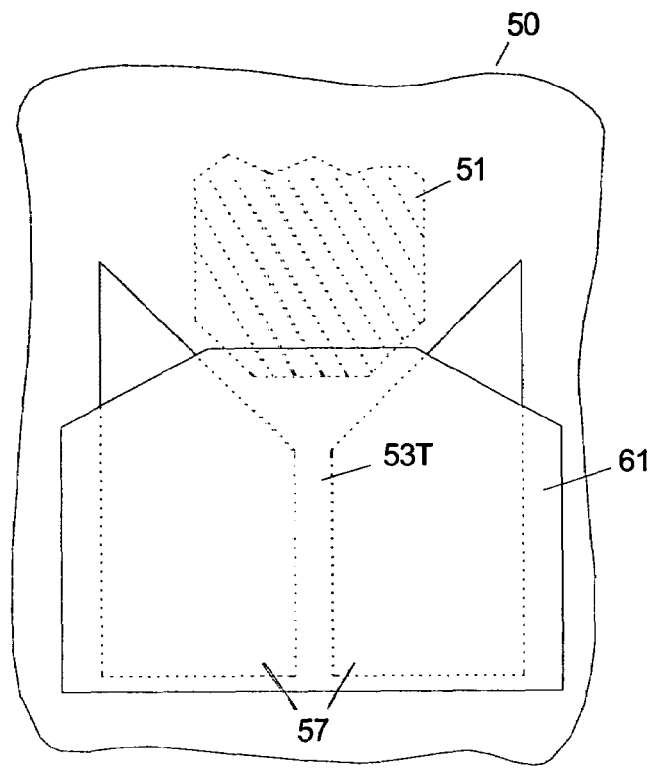
FIG. 6 is an illustration of a plan view of a wafer subsequent to FIG. 5 in a process according to the invention.

FIG. 6 is an illustration of a plan view of a wafer subsequent to FIG. 5. At this point mask 61 has been deposited and patterned to protect the final areas of the side shields 57 and pole tip 53T. The mask 61 extends over the front edge of the shaping pad 51 to allow the residual pole tip material to be in contact with the shaping pad 51. An overlap on the order of 1 micron is reasonable. The unwanted material around the mask is removed preferably by ion milling. The back corners of the side shields (shown as triangular-shaped areas) are removed. The shaping pad is relatively thick to start with ( e.g. 1.5 microns) so the ion milling process of removing the 300 nm of the side shields and pole tip will not affect the shaping layer even if some small amount of material in the shaping layer is removed after the pole material is gone.

Figure 7:
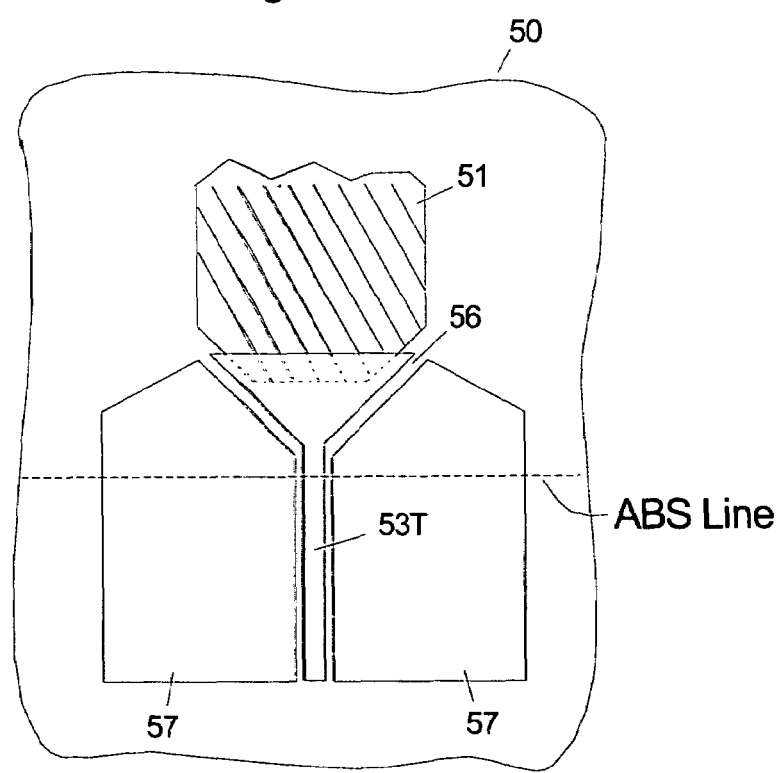
FIG. 7 is an illustration of a plan view of a wafer subsequent to FIG. 6 in a process according to the invention.

FIG. 7 is an illustration of a plan view of a wafer subsequent to FIG. 6 after milling of the unwanted side shield and pole material and stripping of the mask. The pole tip 53T is now defined in its final shape, as well as, the side shields 57. The gap 56 is shown in this view. The top of the shaping pad is exposed on the surface behind the pole tip 53T after the milling process. There is a step down equal to the thickness of the pole tip material where the pole tip ends and the exposed surface of the shaping pad begins. The term ABS line shown in this figure marks the plane along which the wafer will be cut to expose to elements of the head. The prior art process is resumed at this point.

Figure 8A:
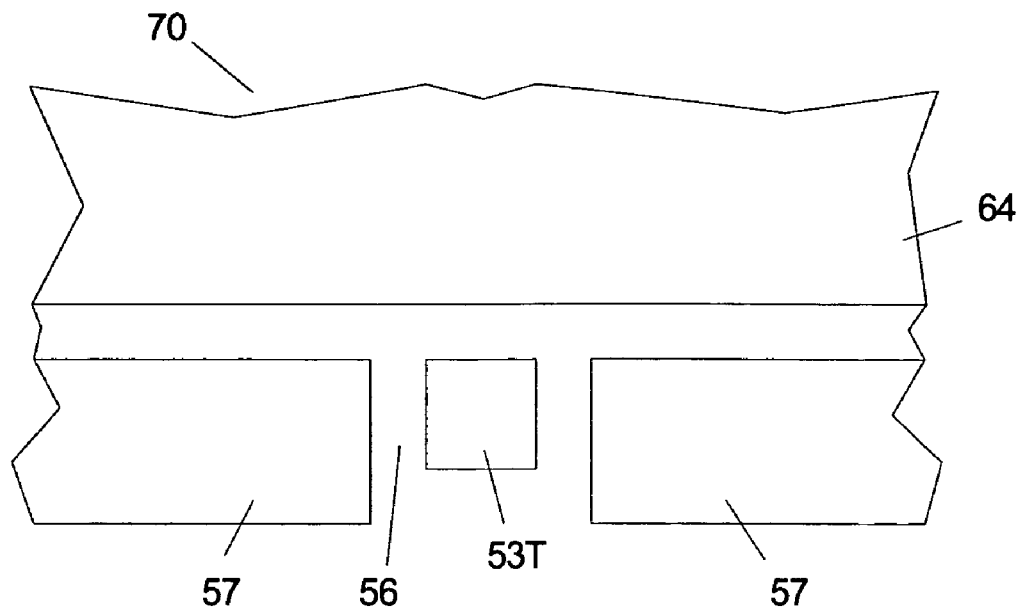
FIG. 8A is an illustration of the ABS view of head with side shields fabricated according to one an embodiment the invention in which the trailing shield is not connected to the side shields.
Figure 8B:
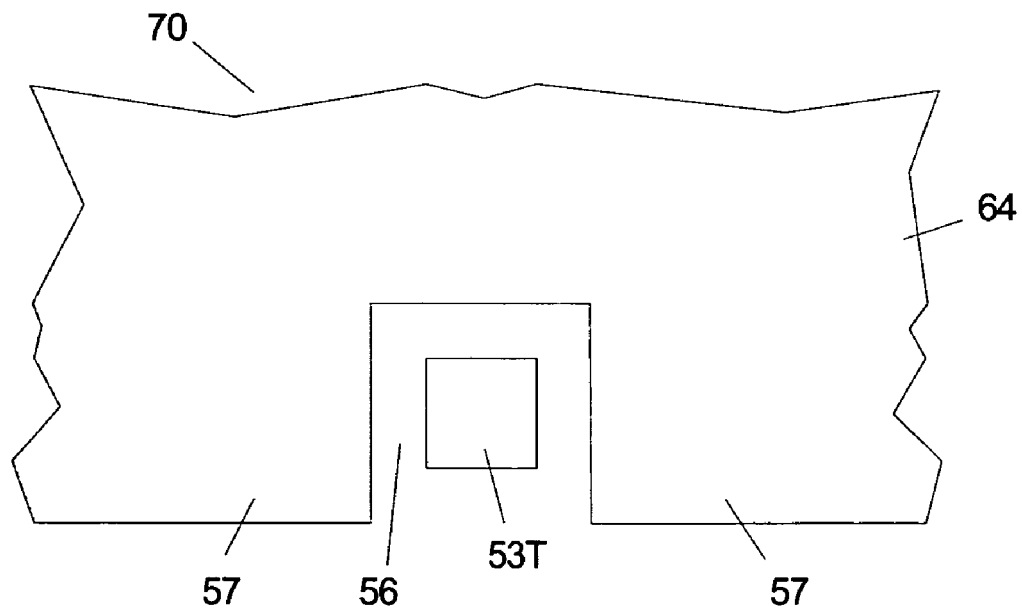
FIG. 8B is an illustration of the ABS view of head with side shields fabricated according to one an embodiment the invention in which the trailing shield is connected to the side shields.
Figure 9:
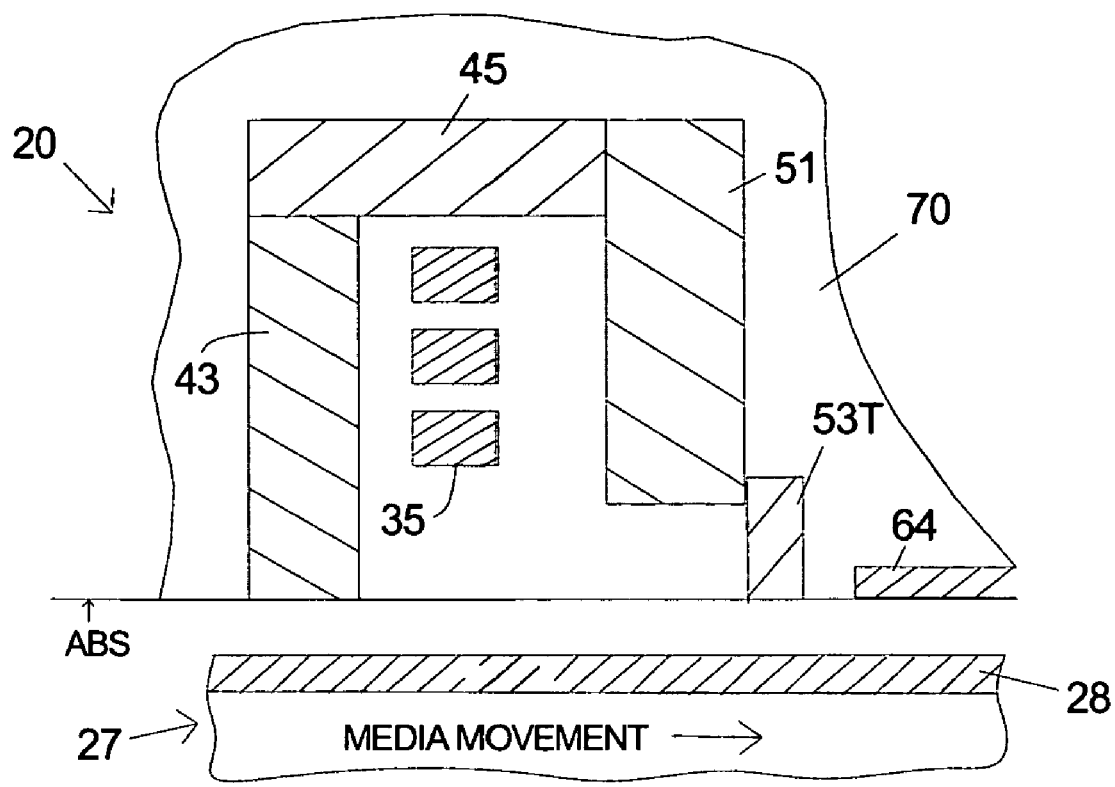
FIG. 9 is an illustration of a section of the head according to the invention and disk in a disk drive.

In alternative embodiments a trailing shield can be included in a head with side shields fabricated according to the invention. FIG. 8A is an illustration of the ABS view of head 70 with side shields 57 fabricated according to an embodiment of the invention in which a trailing shield 64 is not connected to the side shields. FIG. 8B is an illustration of the ABS view of head 70 with side shields 57 fabricated according to an embodiment of the invention in which a trailing shield 64 is connected to the side shields. FIG. 9 is an illustration of a section of an embodiment of a head 70 according to the invention and disk 27 in disk drive 20. The section of the head is through the pole tip so the side shields are not visible in this view. The coil 35 and pole pieces 45, 43 complete the inductive head.

Figure 10:
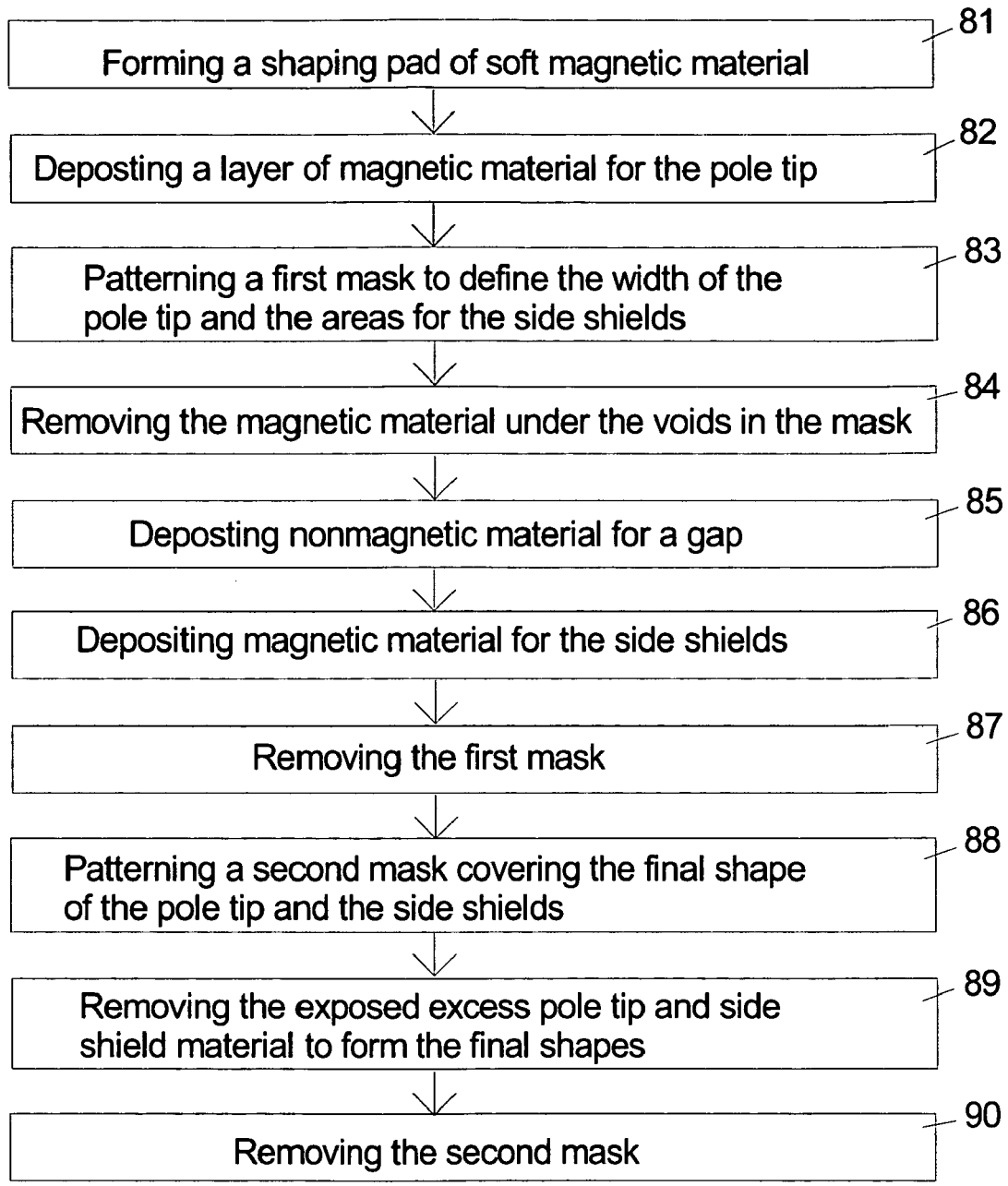
FIG. 10 is a flow chart of a method according to the invention.

FIG. 10 is a flow chart of a method according to the invention. The shaping pad of ferromagnetic material is formed on the wafer 81. The shaping pad terminates prior to a predetermined plane for the air-bearing surface (ABS) so that only the pole tip will extend to the ABS. The a first thin film of ferromagnetic material for a pole tip is deposited over the wafer 82. A first mask is patterned over the ferromagnetic material for the pole tip to protect a selected area for the pole tip which defines the width of the pole tip and simultaneously defines the initial shape for first and second side shields 83. The ferromagnetic material under the voids in the mask is removed forming sidewalls of the pole tip and make the space for the shields 84. In one embodiment the removal process continues after the ferromagnetic material has been removed and removes some of the insulating layer below it so that the side shields will ultimately be thicker than the pole tip. A layer of nonmagnetic material is deposited over the wafer including on the sidewalls of the pole tip to form the gap between the pole tip and the side shields 85. The magnetic material for the first and second side shields is deposited over the wafer 86. The first mask is removed preferably by CMP 87. A second mask is patterned on the wafer to define the final shapes for the pole tip and for the side shields 88. The final shape for the pole tip preferably overlaps only a small strip of the shaping pad (for example, approximately 10% of the length of the shaping pad). The pole tip and side shields are trimmed to their final shape by removing material not protected by the second mask 89 and the second mask is removed 90.

The invention has been described with respect to particular embodiments, but other uses and applications for the invention will be apparent to those skilled in the art.

The invention claimed is:

1. A method for fabricating a thin film magnetic recording head for perpendicular recording comprising the steps of:
   forming a shaping pad of ferromagnetic material for a write head on a wafer, the shaping pad terminating prior to a predetermined plane for an air-bearing surface;
   depositing a first thin film of ferromagnetic material for a pole tip over the wafer;
   patterning a first mask over the first thin film of ferromagnetic material for the pole tip to protect a selected area for the pole tip, the first mask having voids on first and second sides of the selected area for the pole tip defining an initial shape for first and second side shields and a width of the pole tip;
   removing the first thin film of ferromagnetic material under the voids forming sidewalls of the pole tip;
   depositing a thin film of a nonmagnetic material over the wafer including on the sidewalls of the pole tip;
   depositing a thin film of a magnetic material over the wafer for the first and second side shields;
   removing the first mask;
   patterning a second mask on the wafer defining a final shape for the pole tip and defining a final shape for the first and second side shields, the final shape for the pole tip overlapping at least a portion of the shaping pad;
   trimming the pole tip and first and second side shields to the final shape for the pole tip and the first and second side shields by removing materials not protected by the second mask; and
   removing the second mask.

2. The method of claim 1 wherein the step of removing the first thin film of ferromagnetic material under the voids further comprises removing a material under the voids to a depth below a bottom plane of the first thin film of ferromagnetic material for the pole tip so that the first and second side shields will be thicker than the pole tip.

3. The method of claim 1 further comprising the step of forming a trailing shield after removing the second mask.

4. The method of claim 1 wherein the step of patterning the second mask further comprises positioning the second mask to overlap a predetermined portion of the shaping pad so that the pole tip will overlap the shaping pad in a strip and the shaping pad extends beyond the pole tip in a direction perpendicular to the predetermined plane for the air-bearing surface.

5. The method of claim 1 wherein the thin film of the nonmagnetic material is an oxide.

6. The method of claim 1 wherein the thin film of the nonmagnetic material is aluminum oxide or silicon oxide.

7. The method of claim 1 wherein the protected area for the pole tip in the first mask widens before extending over the shaping pad.

8. The method of claim 1 wherein the voids on first and second sides of the selected area for the pole tip are trapezoidal in shape.

* * * * *